United States Patent [19]
Chay

[11] 3,919,401
[45] Nov. 11, 1975

[54] METHOD OF PREVENTING FORMATION OF SODIUM-IRON SULFATE IN THE PREPARATION OF SODIUM BISULFATE

[75] Inventor: Dong Myung Chay, Wilmington, Del.

[73] Assignee: E. I. Du Pont de Nemours & Company, Wilmington, Del.

[22] Filed: July 29, 1974

[21] Appl. No.: 492,938

[52] U.S. Cl. ................................ 423/520; 423/594
[51] Int. Cl.$^2$ .......................................... C01D 5/02
[58] Field of Search .......... 423/520, 264, 265, 269, 423/594

[56] References Cited
UNITED STATES PATENTS
3,690,825    9/1972    Ott ..................................... 423/520

Primary Examiner—Earl C. Thomas

[57] ABSTRACT

Double salts of sodium bisulfate are prevented by the addition of phosphoric acid to the reaction mixture in which the sodium bisulfate is formed.

7 Claims, No Drawings

METHOD OF PREVENTING FORMATION OF SODIUM-IRON SULFATE IN THE PREPARATION OF SODIUM BISULFATE

BACKGROUND OF THE INVENTION

Sodium bisulfate is a chemical that is eminently suitable for use, for example, in toilet bowl cleaning compositions, as metal cleansers and so on. Generally, sodium bisulfate is prepared by heating sulfuric acid at a temperature of about 316C. in a cast iron retort and adding sodium chloride or disodium sulfate or a mixture thereof. The molten sodium bisulfate is then sprayed by means of a cylindrical basket having holes of a diameter of about 1 millimeter along the walls thereof while the basket is rotated at a high speed. The result of this operation is the formation of spherical particles of globular sodium bisulfate having a diameter of slightly less than about 1 millimeter.

However, because of the corrosive nature of sulfuric acid, particularly in the heated state prior to the formation of the sodium bisulfate, and because of the highly active nature of the sodium bisulfate itself, the iron of the cast iron retort in which the sodium bisulfate is generally prepared is attacked and the double salt of sodium-iron sulfate, that is, $Na_3Fe(SO_4)_3$, is formed. The double salt forms in the shape of elongated crystals having a length of 0.08–0.15 mm and a length to diameter ratio of 3 to 5. These elongated crystals bridge the holes in the rotating basket and plug them to the extent that, in a commercial operation, the basket would require replacement on the average of about once every hour. By contrast, when the molten sodium bisulfate being sprayed contains little or no double salt, it is only necessary to replace the rotating cylindrical basket on an average of about 3 to 6 times in each 24-hour period. To date, no suitable substitute for the cast iron retort has been developed which is suitable for the commercial production of sodium bisulfate. As a consequence, because a manufacturer is compelled to use the cast iron retort a terrible production burden it experienced because the sodium bisulfate double salt forms via attack on the iron metal.

SUMMARY OF THE INVENTION

It has now been found that the formation of $Na_2Fe(SO_4)_3$ which occurs when sulfuric acid is reacted with sodium chloride, or disodium sulfate or mixtures of sodium chloride and disodium sulfate at temperatures of 177–343C. in a cast iron retort can be prevented by the addition of orthophosphoric acid to the reaction mixture. Any sodium chloride and disodium sulfate combinations may be used, ranging from 0–100% by weight of sodium chloride to 100–0% by weight of disodium sulfate based on the total weight of the sodium chloride/disodium sulfate mixture.

DETAILED DESCRIPTION OF THE INVENTION

In general, sulfuric acid is reacted with the sodium chloride and/or disodium sulfate in stoichiometric proportions so that one mole of sulfuric acid is present for every mole of sodium chloride or disodium sulfate or sodium chloride/disodium sulfate mixture, whichever is used. Excesses of sulfuric acid are to be avoided since sulfuric acid is hygroscopic and will pick up water; excesses of the sodium chloride and/or sodium disulfate may be used, however, although stoichiometric quantities are preferred.

In the process of this invention phosphoric acid can be used at any strength. However, it is preferred that high concentrations be used to avoid undesirable cooling of the retort. The amount of phosphoric acid required ranges from 1 to 2 moles of phosphoric acid per mole of iron. Generally, the amount of phosphoric acid used is from about 0.05 to about 0.2% by weight based on the weight of the final product, and preferably 0.1 to 0.15%. The concentration of iron in the molten sodium bisulfate can be determined readily by simply making a trial run in the vessel in which the sodium bisulfate is to be produced. Analysis of the resulting product will reveal the amount of iron present and the amount of phosphoric acid to be added can be calculated on the basis of 1 to 2 moles of phosphoric acid per mole of iron. Greater quantities of phosphoric acid may be used if desired but such excess quantities would cause a build-up of a thick layer of foam which forms in the retort due to HCl gas liberated from the reaction of NaCl and $H_2SO_4$ leading to operating difficulty.

The phosphoric acid can be added to the reaction mixture in which the sodium bisulfate is being formed at any time before or after the formation of the double salt presents an increase in basket-change frequency. However, it is preferred that the phosphoric acid be added at the same time that the initial reactants are introduced into the cast iron retort. On a continuous basis, it has been found to be most convenient to meter phosphoric acid together with the sulfuric acid into the reaction mixture in order to insure against the formation of any double salt in the continuous process. In a batch process, however, the phosphoric acid can be added with the initial reactants either mixed with the sulfuric acid or simultaneously with the sulfuric acid and sodium chloride and/or disodium sulfate or it can be added immediately after these reactants are introduced into the cast iron retort.

It is to be understood that any of the conditions involved in the preparation of the sodium bisulfate product may be varied without effect upon the unexpected advantages to be derived by the practice of this invention and that the concentration and quantity of sulfuric acid and sodium chloride and/or disodium sulfate used in such preparation is irrelevant to the operation of this invention. Likewise, the temperature to which the sulfuric acid is heated, the rate of introduction of the reactants to one another, the order of addition and so on are completely irrelevant to the operation of this invention with the exception that the phosphoric acid must be added to the reaction mixture before much double salt has had an opportunity to form and preferably at the same time at which the sulfuric acid and sodium chloride and/or disodium sulfate reactants are being introduced into the cast iron retort.

The invention is further illustrated but is not intended to be limited by the following examples in which all parts and percentages are by weight unless otherwise specified.

$NaHSO_4$ PRODUCTION

A. A commerical process for making sodium bisulfate is as follows:

The reaction of stoichiometric amounts of sodium chloride and concentrated sulfuric acid (99-100%) is carried out in a cast iron retort at 204–340C. The molten sodium bisulfate resulting from the reaction is then made into small spherical particles of about 0.8 mm across by spraying it through a perforated rotating basket. It is found that in using certain types of cast iron retorts, the basket pluggage was so severe that basket change was required about 20 times over a period of 24 hours. The cause of the basket pluggage is due to the undesirable sodium-iron sulfate double salt [Na$_3$Fe(SO$_4$)$_3$] crystals, 0.01–0.04 mm across ¼ 0.1–0.2 mm long, formed in the retort. The elongated crystals packed together in such a way as to bridge across the holes in the basket which have a diameter of about 0.02 inch to plug them. A sample of the sodium bisulfate product is measured out and disolved in water. An aliquot portion taken from this solution is subjected to atomic absorption spectroscopic analysis and the total amount of ion present is determined.

EXAMPLE 1

Under the same operating conditions described in (A) above, 1 mole of orthophosphoric acid, 75% concentration in water, was added to the retort per mole of iron (Fe) present in the sodium bisulfate melt. The addition was made by mixing the orthophosphoric acid with the sulfuric acid before the sulfuric acid was added to the retort to react with the sodium chloride. The frequency of the basket change was reduced to 6 times per 24-hour operating period starting about 3 hours after the phosphoric acid addition was made.

Analyses showed that the basket residue contained 32 % phosphate (PO$_4^{(-3)}$) and 21% sulfate (SO$_4^{(-2)}$).

EXAMPLE 2

Under the same operating conditions described in (A) above, 2 moles of 85% orthophosphoric acid per mole of iron present in the sodium bisulfate melt were added to the retort simultaneously with sulfuric acid and sodium chloride. In this case the basket change frequency was reduced to 3 times in a 24-hour operating period.

EXAMPLE 3

Under the same operating conditions described in (A) above except that the sodium chloride was replaced with a stoichiometric amount of disodium sulfate, 1 moles of 75% orthophosphoric acid were added to the cast iron retort per mole of iron. The phosphoric acid addition was made immediately after the sulfuric acid and disodium sulfate additions. The basket change frequency dropped from 17 times to 4 times per 24-hour operating period. The basket residue contained 40% phosphate (PO$_4^{(-3)}$) and 10% sulfate (SO$_4^{(-2)}$).

It is to be understood that any of the components and conditions mentioned as suitable herein can be substituted for its counterpart in the foregoing examples and that although the invention has been described in considerable detail in the foregoing, such detail is solely for the purpose of illustration. Variations can be made in the invention by those skilled in the art without departing from the spirit and scope of the invention except as set forth in the claims.

What is claimed is:

1. In a process for the production of sodium bisulfate from a reaction mixture containing sulfuric acid with sodium chloride or disodium sulfate or a mixture of sodium chloride and disodium sulfate at an elevated temperature in an iron vessel in which Na$_3$Fe(SO$_4$)$_3$ also forms, the improvement which comprises adding phosphoric acid to the reaction mixture to prevent the formation of a significant amount of Na$_3$Fe(SO$_4$)$_3$.

2. The process of claim 1 wherein from 1 to 2 moles of phosphoric acid are added per mole of iron present in sodium bisulfate in the reaction mixture.

3. The process of claim 1 wherein the phosphoric acid is added to the sulfuric acid before the sulfuric acid is introduced into the reaction mixture.

4. The process of claim 1 wherein the phosphoric acid is added simultaneously with the sulfuric acid and the sodium chloride.

5. The process of claim 1 wherein the phosphoric acid is added immediately after the sulfuric acid and sodium chloride.

6. The process of claim 1 wherein the reaction mixture contains sulfuric acid and disodium sulfate.

7. The process of claim 1 wherein the reaction mixture contains 0–100% by weight of sodium chloride to 100–0% by weight of disodium sulfate based on the total weight of sodium chloride and disodium sulfate.

* * * * *